United States Patent
Lee et al.

(10) Patent No.: US 9,245,703 B2
(45) Date of Patent: Jan. 26, 2016

(54) METHOD AND APPARATUS FOR USING A PORTABLE TERMINAL

(71) Applicant: Samsung Electronics Co. Ltd., Suwon-si, Gyeonggi-do (KR)

(72) Inventors: Yo-Han Lee, Seoul (KR); Kwang-Tai Kim, Suwon-si (KR); Ji-Hea Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 14/136,723

(22) Filed: Dec. 20, 2013

(65) Prior Publication Data
US 2014/0177396 A1 Jun. 26, 2014

(30) Foreign Application Priority Data
Dec. 20, 2012 (KR) .................. 10-2012-0149523

(51) Int. Cl.
*G04G 13/00* (2006.01)
*H01H 43/02* (2006.01)
*G06F 3/0489* (2013.01)
*G06F 3/0488* (2013.01)

(52) U.S. Cl.
CPC ............ *H01H 43/02* (2013.01); *G06F 3/0489* (2013.01); *G06F 3/04886* (2013.01); *G04G 13/00* (2013.01)

(58) Field of Classification Search
CPC ....... G04G 13/00; H01H 43/02; G06F 3/0489
See application file for complete search history.

(56) References Cited

U.S. PATENT DOCUMENTS

| | | | |
|---|---|---|---|
| 8,701,560 B2 * | 4/2014 | Condit | F23Q 21/00 102/215 |
| 2006/0071914 A1 * | 4/2006 | Kuroume | G06F 3/04886 345/173 |
| 2006/0105836 A1 * | 5/2006 | Walker | G07F 17/32 463/25 |
| 2008/0057926 A1 * | 3/2008 | Forstall | G06F 3/0482 455/415 |
| 2009/0273571 A1 * | 11/2009 | Bowens | G06F 3/03547 345/173 |
| 2012/0011456 A1 | 1/2012 | Noda et al. | |
| 2012/0077578 A1 * | 3/2012 | Walker | G07F 17/32 463/27 |
| 2012/0218190 A1 | 8/2012 | Pechanec et al. | |

FOREIGN PATENT DOCUMENTS

| | | |
|---|---|---|
| JP | 2002204386 A | 7/2002 |
| KR | 1019960008400 A | 3/1996 |
| WO | 2009-158208 A1 | 12/2009 |

* cited by examiner

*Primary Examiner* — Sean Kayes
(74) *Attorney, Agent, or Firm* — Jefferson IP Law, LLP

(57) ABSTRACT

A method for using a portable terminal includes activating a timer function with respect to a certain button if a touch on the button is detected for at least a predetermined time, measuring a touch hold time with respect to the button from a time point at which the touch is input when the timer function is activated, setting a countdown time corresponding to the touch hold time with respect to the button, performing a countdown for the set countdown time when the touch on the button ends, and performing a function corresponding to the button when the countdown is completed.

20 Claims, 5 Drawing Sheets

METHOD AND APPARATUS FOR USING A PORTABLE TERMINAL

CROSS-REFERENCE TO RELATED APPLICATION(S)

This application claims the benefit under 35 U.S.C. §119(a) of a Korean patent application filed on Dec. 20, 2012 in the Korean Intellectual Property Office and assigned Serial No. 10-2012-0149523, the entire disclosure of which is hereby incorporated by reference.

TECHNICAL FIELD

The present disclosure relates to a method and an apparatus for using a portable terminal. More particularly, the present disclosure relates to a method and an apparatus for performing a function of a specific application in a portable terminal including a touch screen.

BACKGROUND

As a portable terminal evolves to various forms such as a smart phone or a tablet PC, the portable terminal provides various useful functions to the user, and accordingly the portable terminal is generally used.

The portable terminal provides an environment in which various applications are executed. A user may download and use desired applications through an application store.

The applications provide various types of soft buttons and the user may request to perform functions corresponding to the soft buttons by operating (e.g., touching) the soft button. For example, in an application for playing a multimedia, if a soft button corresponding to a play function is displayed, the user may request to play a certain multimedia with a touch input by performing a touch on the soft button corresponding to the play function with a finger and thereafter releasing the touch.

Meanwhile, according to the related art, at the time of touch input on a soft button (hereinafter, a button), a function corresponding to the button is instantly executed. In this case, it is inconvenient for the user to set a time for executing the function corresponding to the button.

According to the related art, a button for capturing an image in a camera application has a timer function. However, the button provides a timer function only for predetermined times (e.g., 2 seconds and 10 seconds) and the timer function is set through a separate menu.

For example, the related art provides a reservation function for reserving a time for executing a function corresponding to a button, but requires many steps of loading a menu for setting the reservation function, setting a time for the reservation function, inputting the button, and the like.

Accordingly, there is a need for an apparatus and method for simply and easily setting a time for executing a function corresponding to a specific button.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, the present disclosure is to provide an apparatus and method for simply and easily setting a time for executing a function corresponding to a specific button without going through various complicated steps.

According to an aspect of the present disclosure, a function of setting a time for performing a function that is provided by an application corresponding to a button may be provided with a one-time (one-depth) touch input on the button.

In accordance with an aspect of the present disclosure, a method for using an electronic apparatus (e.g., a portable terminal) is provided. The method includes activating a timer function with respect to a certain button if a touch on the button is detected for at least a predetermined time, measuring a touch hold time with respect to the button from a time point at which the touch is input when the timer function is activated, setting a countdown time corresponding to the touch hold time with respect to the button, and performing a countdown for the set countdown time when the touch on the button ends, performing a function corresponding to the button when the countdown is completed. The input hold time as measured with the timer can include the predetermined time. It is also possible to later add the predetermined time. The timer can be started when the button is pushed. The timer can also be started after a button has been pushed for a predetermined time. The timer can measure the time starting from the button was pushed or from the time the timer was started. All of these variants are included in the feature "measuring an input hold time with respect to the button from a time point at which the input by the button is started".

In accordance with another aspect of the present disclosure, an apparatus for using a portable terminal is provided. Said apparatus can be a sub module of the portable terminal, or it can be the portable terminal itself The apparatus includes a display unit that is provided with a touch screen and that is configured to display at least one button when performing an application, and a controller that is configured to perform control to activate a timer function with respect to the button if a touch on the button is detected for at least a predetermined time, to measure a touch hold time with respect to the button from a time point at which the touch is input when the timer function is activated, to set a countdown time corresponding to the touch hold time with respect to the button, to perform a countdown for the set countdown time when the touch on the button ends, and to perform a function corresponding to the button when the countdown is completed.

Accordingly, an embodiment of the present disclosure provides an effect of conveniently and promptly setting a time for performing a function corresponding to a specific button, without going through various complicated steps, by providing a function of setting a time for performing a function that is provided by an application corresponding to a button may be provided with a one-time (one-depth) touch input on the button.

Other aspects, advantages, and salient features of the disclosure will become apparent to those skilled in the art from the attached claims and the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
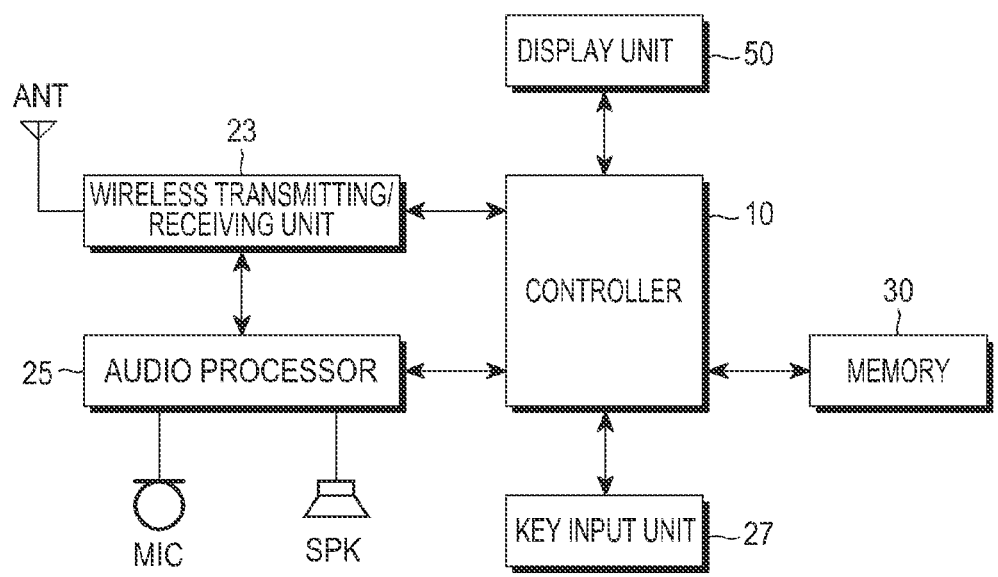
FIG. 1 is a schematic block diagram illustrating a portable terminal according to an embodiment of the present disclosure.

FIG. 1 is a schematic block diagram illustrating a portable terminal according to an embodiment of the present disclosure.

Referring to FIG. 1, the electronic apparatus according to the embodiment of the present disclosure is assumed to be a portable terminal that is easy to carry in view of a weight and a size, but the electronic apparatus according to the embodiment of the present disclosure is not limited to the portable terminal An example of a portable terminal according to an embodiment of the present disclosure may be a conventional feature phone, an electronic apparatus (e.g., a smart phone or a tablet) driven by Bada, Tizen, Windows series (e.g., Windows 8), iOS, Android, or the like. Additionally, the portable terminal according to an embodiment of the present disclosure may be a notebook computer, a digital camera, or a video phone, a Personal Digital Assistant (PDA), a portable game console, an MP3 player, a Portable/Personal Multimedia Player (PMP), a handheld e-book, a tablet computer, a Global Positioning System (GPS) navigation, or the like. At this point, it is obvious to those skilled in the art that the portable terminal according to an embodiment of the present disclosure is not limited to the apparatuses described above.

As illustrated in FIG. 1, the portable terminal includes a controller 10, a wireless transmitting/receiving unit 23, an audio processor 25, a key input unit 27, a memory 30, and a display unit 50.

The wireless transmitting/receiving unit 23 includes an RF unit and a modem. The RF unit includes an RF transmitter that up-converts and amplifies the frequency of a signal to be transmitted and an RF receiver that performs low noise amplification with a received signal and down-converts the frequency thereof The modem includes a transmitter that encodes and modulates a signal to be transmitted and a receiver that demodulates and decodes a signal received by the RF unit. At this point, it is obvious to those skilled in the art that a near field communication module such as a Wi-Fi module can supplement or substitute the function of the wireless transmitting/receiving unit 23.

According to various embodiments of the present disclosure, it is possible to configure a countdown time corresponding to a touch hold time of a user with respect to a button provided by an application, and to divide the countdown time configured corresponding to the touch hold time with respect to the button per application according to the modified embodiment of the present disclosure, in performing the countdown with respect to the button by the configured countdown time.

Accordingly, by a wireless transmitting/receiving unit 23 according to an embodiment of the present disclosure, a controller 10 may receive a configuration value of the countdown time configured by the touch hold time with respect to the button of the application. Thereafter, the controller 10 may configure the countdown time corresponding to the touch hold time with respect to the button by the received configuration value. As an example, the controller 10 may receive the configuration value from a server storing application settings, a user profile, and/or the like.

For example, by the received configuration value, an application A configures a countdown time of 2 seconds and 4 seconds to a touch hold time of 1 second and 2 seconds, respectively, while an application B configures a countdown time of 3 seconds and 6 seconds to a touch hold time of 1 second and 2 seconds, respectively. Accordingly, the controller 10 performs configuration so that the countdown time of 4 seconds is set if the touch hold time with respect to the button of the application A is 2 seconds, while the countdown time of 6 seconds is set if the touch hold time with respect to the button of the application B is 2 seconds.

The audio processor 25 may configure a codec and the codec may include a data codec and an audio codec. The data codec processes packet data and the audio codec processes an audio signal such as sound and multimedia files. The audio processor 25 converts a digital audio signal received from the modem with the audio codec and plays the converted audio signal and converts an analog audio signal generated from the microphone through the audio codec into a digital audio signal and transmits the converted audio signal to the modem. The codec may be provided separately or included in the controller 10.

According to various embodiments of the present disclosure, the controller 10 may perform control of the audio processor 25 so that a countdown time configured corresponding to a touch hold time of the button is informed to the user with sound information. For example, the controller 10 may control the audio processor 25 to provide an audio indication of the countdown time.

As an example, if the portable terminal is configured such that the countdown time of 2 seconds and 4 seconds with respect to the button is configured with respect to touch hold times of 1 second and 2 seconds, respectively and the user touches the button for 2 seconds, in total, and if the user touches the button for 1 second, then the controller informs that the countdown time is configured to be 2 seconds. However, if the user touches the button for 2 seconds, the controller informs that the countdown time is configured to be 4 seconds so that the user is informed 2 times for the touch hold time of 2 seconds.

A key input unit 27 may include keys required for inputting figures and character information, function keys required for configuring various functions, a touch pad, or the like. The key input unit 27 may include at least one software key (e.g., at least one button displayed on the touch screen) or at least one hardware key (e.g., a volume control button, a home button, a menu button, a backward button etc.). If a display unit 50 is realized in a touch screen scheme, the key input unit 27 may include predetermined minimum keys, and the display unit 50 partially substitutes the key input function of the key input unit 27. For example, the display unit 50 may be configured as a touchscreen through which a user may input commands or otherwise press buttons displayed on the display unit 50.

According to various embodiments of the present disclosure, the user may use the key input unit 27 to activate or deactivate the timer function with respect to the button. According to various embodiments of the present disclosure, if the user sustains a input on the button (e.g., a touch of software key or a push of hardware key for a predetermined time or more (e.g., time $t_{th}$ illustrated in FIG. 3A or more), a function of activating a timer function on the button is provided, but the timer function can be activated/deactivated with a predetermined key using the key input unit 27 or the touch screen of the display unit 50, if necessary.

The memory 30 may be configured with a program memory or data memories. The program memory stores programs for controlling general operations of the portable terminal The memory 30 may further include an external memory such as Compact Flash (CF), Secure Digital (SD), Micro Secure Digital (Micro-SD), Mini Secure Digital (Mini-SD), Extreme Digital (xD), Memory Stick, or the like. In addition, the memory 30 may include a disk such as a Hard Disk Drive (HDD), a Solid State Disk (SSD), or the like.

The memory 30 according to the embodiment of the present disclosure may store a configuration value on a countdown time configured corresponding to a touch hold time with respect to the button. In addition, the memory 30 according to an embodiment of the present disclosure may store a configuration value mentioned in the description with respect to the wireless transmitting/receiving unit 23. The controller 10 may perform a countdown by configuring a countdown time referring to the configuration values.

The display unit 50 may be configured with Liquid Crystal Display (LCD) or Organic Light Emitting Diodes (OLED) such as a Passive-Matrix OLED (PMOLED) or an Active Matrix OLED (AMOLED), or the like. The display unit 50 may output various kinds of display information. The display unit 50 may include a capacitive or resistive touch screen, and the user may use the display unit 50 singly, or use the display unit 50 and a key input unit 40 in combination to operate a portable terminal (e.g., to touch a button). Further, the display unit 50 may include a digitizer with the touch screen.

According to various embodiments of the present disclosure, the touch on the button may be performed with a part of the body of the user (e.g., a finger) or a separate input apparatus (e.g., a touch pen corresponding to a touch screen or a pen corresponding to a digitizer).

According to various embodiments of the present disclosure, the controller 10 may control overall operations of the portable terminal, and may convert or control the operation of the portable terminal according to the input of the user which is input through the key input unit 27, the display unit 50, or the like. In addition, according to various embodiments of the present disclosure, the controller 10 controls overall operations relating to the steps of activating a timer function on the button if a touch on a predetermined button is detected for a predetermined time or more, measuring a touch hold time on the button from a point when the touch is input if the timer function is activated, configuring a countdown time corresponding to touch hold time on the button, performing a countdown on the predetermined countdown time if the touch on the button ends, and performing a function corresponding to the button if the countdown is completed. The detailed operations of the controller 10 according to the embodiment of the present disclosure will be described as follows.

Meanwhile, the block diagram of FIG. 1 does not illustrate devices that may be included in the portable terminal, such as a Bluetooth module, a camera module, a Wi-Fi module, an acceleration sensor, a proximity sensor, a geomagnetic field sensor, a Digital Media Broadcasting (DMB) receiver, and the like. However, such devices that are not illustrated in the drawing may be provided with the portable terminal according to various embodiments of the present disclosure and may perform corresponding functions.

Figure 2:
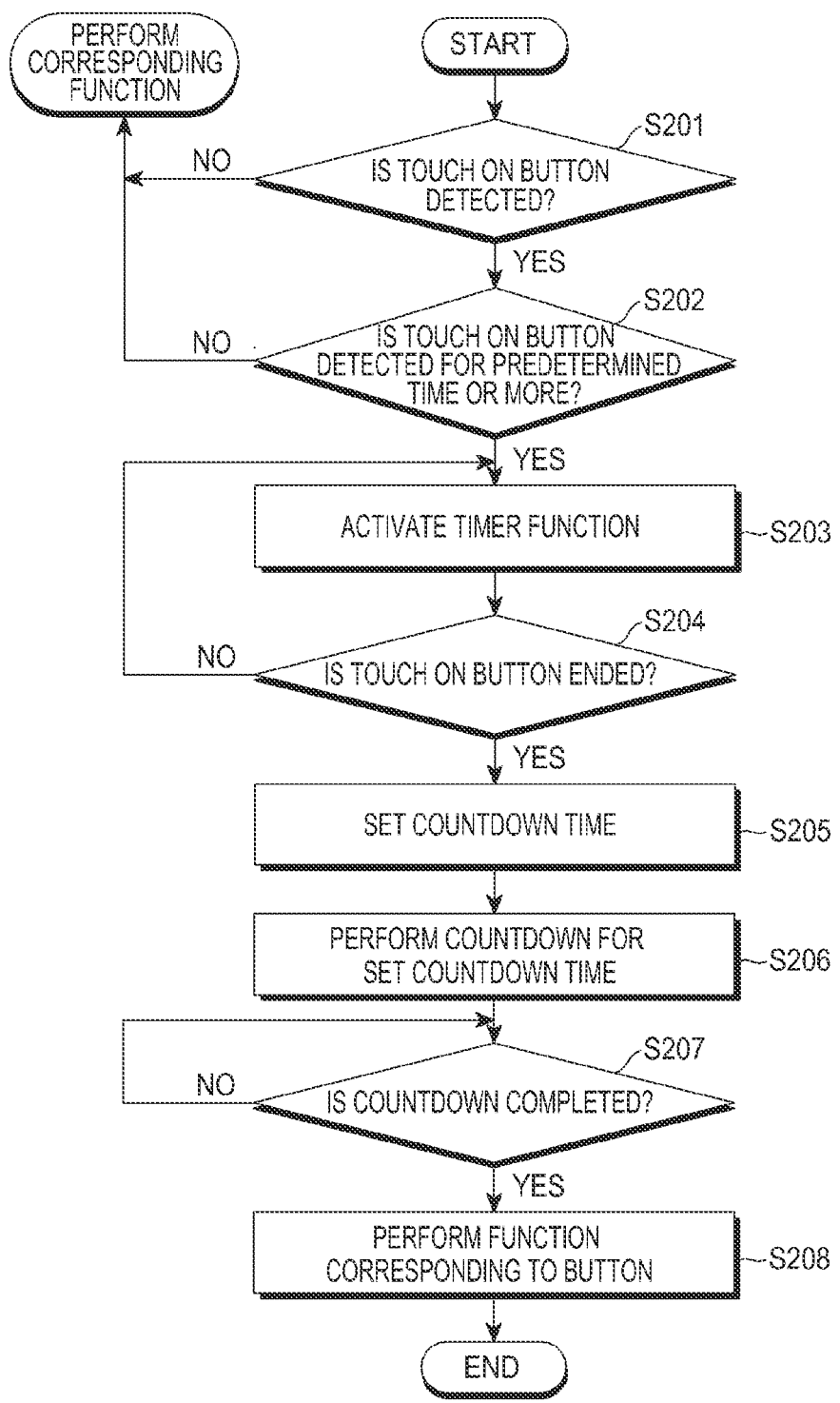
FIG. 2 is a flowchart illustrating a process of using a portable terminal according to an embodiment of the present disclosure.
Figure 3A:
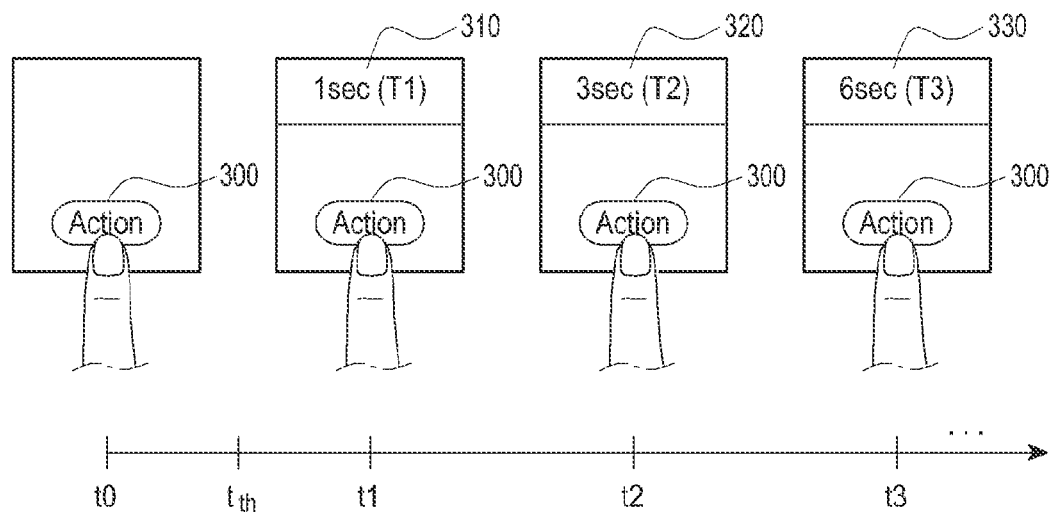
FIG. 3A is a timing diagram illustrating processes of using a portable terminal according to an embodiment of the present disclosure.
Figure 3B:
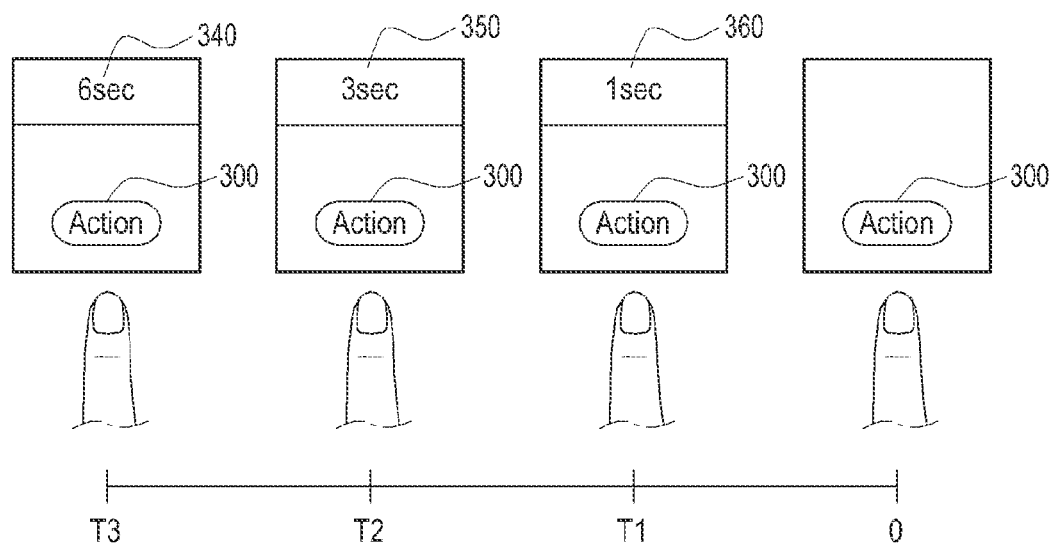
FIG. 3B is a timing diagram illustrating processes of using a portable terminal according to an embodiment of the present disclosure.
Figure 4:
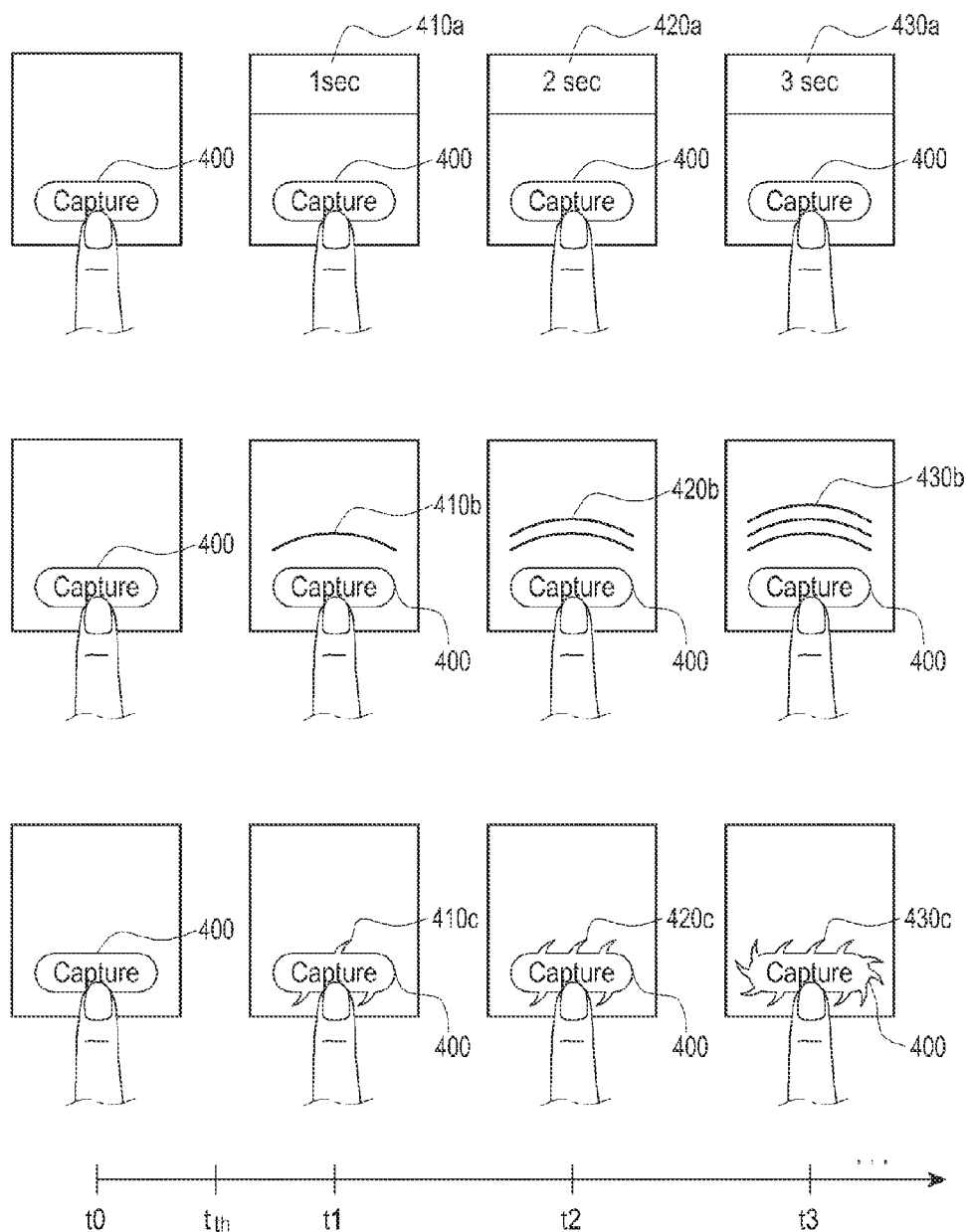
FIG. 4 is a timing diagram illustrating an operation of using a portable terminal according to an embodiment of the present disclosure.
Figure 5:
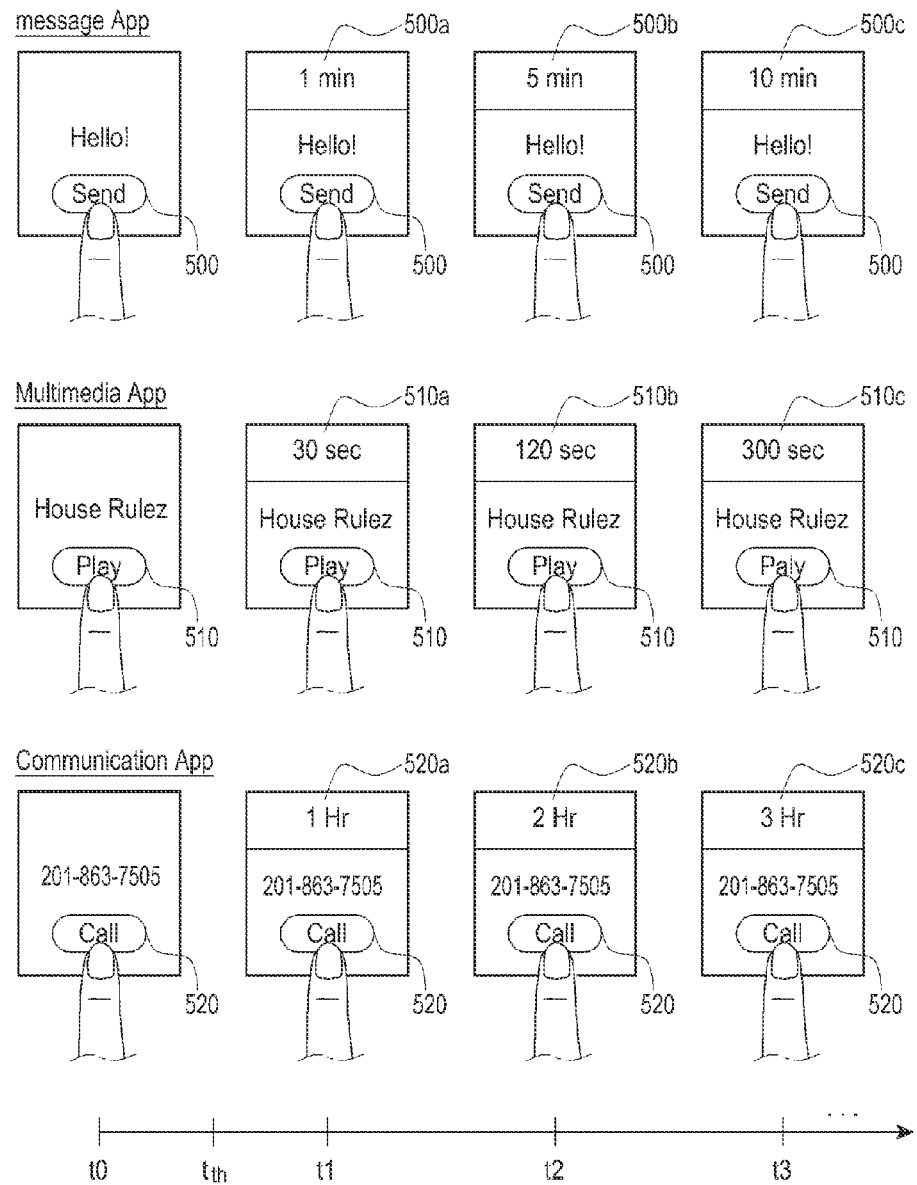
FIG. 5 is a timing diagram illustrating an operation of using a portable terminal according to an embodiment of the present disclosure.

FIG. 2 is a flowchart illustrating a process of using a portable terminal according to an embodiment of the present disclosure. FIGS. 3A and 3B are timing diagrams illustrating processes of using a portable terminal according to an embodiment of the present disclosure. FIG. 4 is a timing diagram illustrating an operation of using a portable terminal according to an embodiment of the present disclosure. FIG. 5 is a timing diagram illustrating an operation of using a portable terminal according to an embodiment of the present disclosure.

Referring to FIGS. 2, 3A, 3B, 4, and 5, at operation S201, the controller 10 determines whether a touch on a button is detected.

If the controller 10 determines that a touch on a button is not detected at operation S201, the controller 10 performs a corresponding function.

In contrast, if the controller 10 determines that a touch on a button is detected at operation S201, then the controller 10 proceeds to operation S202 at which the controller 10 determines whether the touch on the button is detected for a predetermined time or more.

If the controller 10 determines that the touch on the button is not detected for a predetermined time or more at operation S202, the controller 10 performs a corresponding function.

In contrast, if the controller 10 determines that the touch on the button is for a predetermined time or more at operation S202 (when it is confirmed that a touch input on a certain button is detected for a certain time or more), then the controller 10 proceeds to operation S203 at which the controller 10 performs control so as to activate a timer function associated with the button.

In the related art, the user may request to perform the function provided by the corresponding button, by touching on the button displayed on the display unit 50 including a touch screen and releasing the touch (e.g., touching the button by hand and releasing the touch). In contrast, various embodiments of the present disclosure further provide a timer function along with general functions according to the related art as described above.

With reference to FIG. 3A, at a certain time point t0, the user may touch a button 300 displayed when a certain application is executed or a menu is displayed, and may touch the button 300 for a predetermined time $t_th$ or more to request activation of the timer function with respect to the touched button 300. For example, according to various embodiments of the present disclosure, if a certain touch on the button 300 is maintained for the predetermined time $t_th$ or more, the controller 10 performs control so that the timer function with respect to the button 300 is activated. At this point, according to various embodiment of the present disclosure, a menu may be assumed to be a kind of an application, and accordingly the button is displayed after the application is executed, and one or more buttons are displayed. Further, according to various embodiments of the present disclosure, the predetermined time $t_{th}$ may be configured differently according to the kind of the application, and may be changed by the user.

Meanwhile, if the timer functions with respect to the button 300 are activated, the controller 10 performs control so that an elapse time from the time point t0 when a touch on the button 300 is input to a time point (e.g., a time point t3) when the touch on the button 300 ends is measured until the touch ends. For example, the controller 10 according to the present disclosure performs control so that a touch hold time with respect to the button 300 is measured.

As described below, according to various embodiments of the present disclosure, when a timer function is activated, a countdown time is set in proportion with the hold time with respect to the button 300, a countdown is performed for the set countdown time, and a function corresponding to the button 300 is performed when the countdown is completed.

Therefore, according to various embodiments of the present disclosure, the controller 10 controls the countdown time set by a length of the touch hold time by the user with respect to the button 300 to be displayed in various forms of information so that the user may easily check the countdown time that increases corresponding to the touch hold time with respect to the button 300.

For example, as illustrated in FIG. 3A, if a touch on the button 300 starts at a time point t0, and a timer function is activated at a time point $t_{th}$, and a touch on the button 300 maintains through time points t1 and t2 to a time point t3, the controller 10 displays the countdown time set corresponding to each of the time points t1, t2, and t3 in a form of time information, as illustrated in 310, 320, and 330.

Accordingly, when the duration times of the touch on the button 300 are t1, t2, and t3, countdown times of 1 second, 3 seconds, and 6 seconds are set, respectively. Accordingly, a countdown time to be set may be selected. For example, if a countdown time with respect to the button 300 is set to be 3 seconds, the user may maintain a touch on the button 300 for a time from the time point t0 to the time point t2 through displayed information as illustrated in 320.

According to various embodiments of the present disclosure, when the countdown times which are set corresponding to the length of the touch hold time by the user with respect to the button 300 are displayed for the user in various forms of information, various kinds of visual effect for displaying the time information may be used. A description is made with reference to FIG. 4 as follows.

Referring to FIGS. 4, 410a, 420a, and 430a are examples of informing (e.g., displaying), the user of countdown times which are set corresponding to cases when touches on the button 300 are maintained until the time points t1, t2, and t3, respectively, in forms of time information.

Further, 410b, 420b, and 430b are examples of informing the user of countdown times which are set corresponding to cases when touches on the button 300 are maintained until the times points t1, t2, and t3, respectively, by visual effects. In specific, the visual effects corresponding to 410b, 420b, and 430b correspond to examples in which the countdown times are displayed in a display area except the button 300.

Further, 410c, 420c, and 430c correspond to examples of informing the user of countdown times which are set corresponding to cases when touches on the button 400 are maintained until the times points t1, t2, and t3, respectively, by visual effects.

410c, 420c, and 430c correspond to examples in which the form of the button 300 changes according to the kinds of countdown time (e.g., the length of time) which are set, in contrary to 410b, 420b, and 430b. The visual changes of the button 400 as in 410c, 420c, and 430c may be useful when informing the user the countdown times which are set according to the touch hold time with respect to the button 400, when a separate display area to display the countdown time does not exist as illustrated in 410a to 430a and 410b to 430b.

According to the visual effect illustrated by FIG. 4, the user may visually easily check the countdown times which are set to increase as the touch hold time with respect to the button 400 gets longer.

At operation S204, the controller 10 determines whether a touch on the button is ended.

If the controller 10 determines that the touch on the button is not ended at operation S204, then the controller 10 proceeds to operation S203.

In contrast, if the controller 10 determines that the touch on the button is ended at operation S204 (e.g., if it is confirmed that a touch on a button ends), then the controller 10 proceeds to operation S205 at which the controller 10 controls the countdown time to be set corresponding to the time point when the touch ends. For example, at operation S205, the controller 10 may set the countdown time.

As illustrated by the previous steps, according to various embodiments of the present disclosure, when the touch time with respect to the button gets longer, the countdown time which is set corresponding to the length of the touch time is informed to the user by various forms of information. Accordingly, when the user checks the countdown time desired to be set, the user may end or release (e.g., detach the finger from the button) the touch on the button 300.

According to various embodiments of the present disclosure, the controller 10 controls the countdown time to be set corresponding to the touch hold time until the touch on the button 300 is ended (or is released).

As illustrated in FIG. 3A, if the user releases the touch on the button 300 at the time point t1, the countdown time of 1 second is set, if the user releases the touch on the button 300 at the time point t2, the countdown time of 3 seconds is set, and if the user releases the touch on the button 300 at the time point t3, the countdown time of 6 seconds is set.

Meanwhile, according to the embodiment of the present disclosure, countdown times which are set according to touch hold times with respect to a button are classified according to applications so that the timer function can be flexibly applied. For example, each application may have its own countdown time associated therewith.

Therefore, setting countdown times corresponding to touch hold times (e.g., the duration time from a time point of inputting a touch to a time point of ending the touch) with respect to the button means classifying the countdown times which are set according to the touch hold time by the application of the touched button.

Referring to FIG. 5, various embodiments of the present disclosure are described such that t0 is assumed to be 0 seconds, $t_{th}$ is assumed to be 0.5 seconds, t1 is assumed to be 1 second, t2 is assumed to be 2 seconds, and t3 is assumed to be 3 seconds.

If a button 500 illustrated in FIG. 5 is a button of an application relating to a messaging service such as an Short Message Service (SMS), a Multimedia Messaging System (MMS), iMessage for iOS, GoogleTalk for Android, or the like, countdown times which are set corresponding to 1 second (t1), 2 seconds (t2), and 3 seconds (t3) may be set to be 1 minute, 5 minutes, and 10 minutes, as illustrated in 500a to 500c.

Accordingly, when sending a message, a user may make a reservation for sending (e.g., or otherwise schedule to send) the message after 1 minute by touching the send button 500 for 1 second or for sending the message after 10 minutes by touching the send button 500 for 3 seconds.

In the similar manner, if a button 510 illustrated in FIG. 5 is for an application relating to a multimedia service for playing a multimedia such as music, the touch hold time which is set corresponding to the touch hold time of 1 second (t1), 2 seconds (t2) and 3 seconds (t3) may be set to be 30 seconds, 120 seconds, and 300 seconds as illustrated in 510a to 510c.

Accordingly, when playing a multimedia, the user may make a reservation for playing (e.g., or otherwise schedule to play) the multimedia after 30 seconds by touching a play button 510 for 1 second, or playing the multimedia after 120 seconds by touching the play button 510 for 2 seconds.

Finally, if a button 520 illustrated in FIG. 5 is a button for a communication application for transmitting a call to a certain contact, the countdown times which are set corresponding to the touch hold time of 1 second (t1), 2 seconds (t2) and 3 seconds (t3) may be set to be 1 hour, 2 hours, and 3 hours as illustrated in 520a to 520c.

Accordingly, when transmitting a call to a certain number, a user may make a reservation for transmitting (e.g., or otherwise schedule to transmit) a call after 2 hours by touching a call button 520 for 2 seconds, or for transmitting a call after 3 hours by touching the call button 520 for 3 seconds.

At this point, information (e.g., set values) in which countdown times which are set corresponding to touch hold times with respect to the button are different (differentiated) may be stored in the memory 30 in advance, or may be received from an external source by the wireless transmitting/receiving unit 23 or a near field communication module, or may be provided by the installation file of an application.

At operation S206, the controller 10 performs a countdown for the set countdown time. Thereafter, the controller 10 proceeds to operation S207.

At operation S207, the controller 10 determines whether the countdown is completed.

If the controller 10 determines that the countdown is not completed at operation S207, then the controller 10 continues to poll for a determination that the countdown is completed.

In contrast, if the controller 10 determines that the countdown is completed at operation S207 (e.g., when the countdown is completed), the controller 10 proceeds to operation S208.

At operation S208, the controller 10 performs control so that a function corresponding to the button is performed. For example, the control 10 controls to perform a function corresponding to the button when the countdown is completed.

As described with the previous steps, if a countdown time is set corresponding to a touch hold time with respect to the button, the controller 10 performs a countdown for the set countdown time, and performs control so that a function corresponding to the button is performed when the countdown is completed.

With reference to FIGS. 3A to 3B, if a touch is released after maintaining the touch on the button 300 until the time point t3 illustrated in FIG. 3A (e.g., detaching the finger), a countdown time of 6 seconds (T3) is set and the controller 10 performs a countdown for a countdown time of 6 seconds.

At this point, information corresponding to the countdown for the set countdown time may be displayed for the user. For example, as illustrated in 340, 350, and 360 of FIG. 3B, the controller 10 displays elapse processes of the countdown with time information of 6 seconds, 3 seconds and 1 second, so that the user may determine the elapse processes of the countdown.

Meanwhile, the elapse process of the countdown may be displayed with time information as illustrated in 340, 350, and 360 of FIG. 3B, but the elapse process of the countdown may be displayed by visual effects as illustrated in 410b to 430b and 410c to 430c of FIG. 4.

For example, the time information of 340 in FIG. 3B may be substituted with visual effects of 430b or 430c, the time information of 350 may be substituted with visual effects of 420b or 420c, and the time information of 360 may be substituted with visual effects of 410b or 410c.

According to various embodiments of the present disclosure, the user may easily recognize that a function provided by a corresponding button is to be performed by the completion of the countdown by checking steps of processing the countdown with visual effects.

According to various embodiments of the present disclosure described above, a function of setting time for performing a function that is provided by an application corresponding to a button may be provided with a one-time (one-depth) touch input on the button. Further, a time for performing a function corresponding to a specific button can be set conveniently and promptly, without going through various complicated steps.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described reference to various embodiments therefore, it will be understood by those skilled in the art that various changes in form and details may be made therein without departing from the spirit and scope of the present disclosure as defined by the appended claims and their equivalents.

What is claimed is:

1. A method for using an electronic apparatus, the method comprising:
    activating a timer function with respect to a certain button if an input by the button is detected for at least a predetermined time;
    measuring an input hold time with respect to the button from a time point at which the input by the button is started when the timer function is activated;
    setting a countdown time corresponding to the input hold time with respect to the button;
    performing a countdown for the set countdown time when the input by the button ends;
    performing a function corresponding to the button when the countdown is completed; and
    wherein there are a plurality of functions corresponding to a plurality of buttons.

2. A non-transitory computer-readable storage medium storing instructions that, when executed, cause at least one processor to perform the method of claim 1.

3. The method according to claim 1, wherein the setting of the countdown time comprises:
    measuring an input hold time with respect to the button from a time point at which the input by the button is started when the timer function is activated;
    setting the countdown time corresponding to the input hold time with respect to the button; and
    displaying the set countdown time.

4. The method according to claim 3, wherein the displaying of the countdown time comprises displaying the set countdown time as time information.

5. The method according to claim 3, wherein the displaying of the countdown time comprises displaying the set countdown time with a visual effect.

6. The method according to claim 5, wherein the visual effect comprises at least one of:
    an effect of visually changing the button according to the set countdown time, and
    an effect of visually changing a display area other than the button according to the set countdown time.

7. The method according to claim 1, wherein the performing of the function comprises:
    displaying time information corresponding to the performing of the countdown during performing the countdown for the set countdown time; and
    performing the function corresponding to the button when the countdown is completed.

8. The method of claim 1, wherein the performing of the function comprises:
    displaying a visual effect corresponding to the performing of the countdown during performing the countdown for the set countdown time; and
    performing the function corresponding to the button when the countdown is completed.

9. The method of claim 8, wherein the visual effect comprises at least one of:
    an effect of visually changing the button according to the performing of the countdown, and
    an effect of visually changing a display area other than the button according to the performing of the countdown.

10. The method of claim 1, wherein the countdown time which is set corresponding to the input hold time with respect to the button is set to be different according to a kind of application corresponding to the button.

11. An apparatus for using a portable terminal, the apparatus comprising:
    a display unit that is provided with a touch screen and that is configured to display at least one button when performing an application; and
    a controller that is configured to:
    perform a control to activate a timer function with respect to the button if a touch on the button is detected for at least a predetermined time,
    to measure a touch hold time with respect to the button from a time point at which the touch is input when the timer function is activated,
    to set a countdown time corresponding to the touch hold time with respect to the button,
    to perform a countdown for the set countdown time when the touch on the button ends,
    to perform a function corresponding to the button when the countdown is completed; and
    wherein there are a plurality of functions corresponding to a plurality of buttons.

12. The apparatus according to claim 11, wherein, in setting the countdown time, the controller is further configured to:
    perform a control to measure a touch hold time with respect to the button from a time point at which the touch is input when the timer function is activated,
    to set the countdown time corresponding to the touch hold time with respect to the button, and to display the set countdown time.

13. The apparatus according to claim 12, wherein, in displaying the countdown time, the controller is further configured to perform a control to display the set countdown time as time information.

14. The apparatus according to claim 12, wherein, in displaying the countdown time, the controller is further configured to perform a control to display the set countdown time with a visual effect.

15. The apparatus according to claim 14, wherein the visual effect comprises at least one of:
    an effect of visually changing the button according to the set countdown time, and
    an effect of visually changing a display area other than the button according to the set countdown time.

16. The apparatus according to claim 11, wherein, in performing the function, the controller is further configured to:
    perform a control to display time information corresponding to the performing of the countdown during performing the countdown for the set countdown time, and
    to perform the function corresponding to the button when the countdown is completed.

17. The apparatus of claim 11, wherein, in performing the function, the controller is further configured to:
    perform a control to display a visual effect corresponding to the performing of the countdown during performing the countdown for the set countdown time, and
    to perform the function corresponding to the button when the countdown is completed.

18. The apparatus of claim 17, wherein the visual effect comprises at least one of:
    an effect of visually changing the button according to the performing of the countdown, and an effect of visually changing a display area other than the button according to the performing of the countdown.

19. The apparatus of claim 11, wherein the countdown time which is set corresponding to the touch hold time with respect to the button is set to be different according to a kind of application corresponding to the button.

20. A method for using an electronic apparatus, the method comprising:
   detecting an input by a button;
   determining whether the input is maintained for at least a predetermined time;
   activating a timer if the input is maintained for at least the predetermined time;
   measuring a length of time the input is maintained after the timer is activated;
   setting a countdown time based on the application in which the button is input and the measured length of time;
   performing a countdown for the set countdown time; and
   performing a function corresponding to the button,
   wherein there are a plurality of functions corresponding to a plurality of buttons.

* * * * *